US011884212B2

(12) United States Patent
Lettis et al.

(10) Patent No.: US 11,884,212 B2
(45) Date of Patent: Jan. 30, 2024

(54) REARVIEW DEVICE WITH MOVEABLE HEAD ASSEMBLY AND VEHICLE THEREWITH

(71) Applicant: SMR Patents S.à.r.l., Luxembourg (LU)

(72) Inventors: Andrew Lettis, Portchester (GB); Graham Rehill, Portchester (GB); Callum Scott-Collins, Portchester (GB); Steve Rawding, Portchester (GB); Matthew Smit, Portchester (GB)

(73) Assignee: SMR Patents S.à.r.l., Luxembourg (LU)

( * ) Notice: Subject to any disclaimer, the term of this patent is extended or adjusted under 35 U.S.C. 154(b) by 369 days.

(21) Appl. No.: 17/233,840

(22) Filed: Apr. 19, 2021

(65) Prior Publication Data

US 2021/0237648 A1    Aug. 5, 2021

Related U.S. Application Data

(63) Continuation-in-part of application No. 16/624,507, filed as application No. PCT/EP2018/067842 on Jul. (Continued)

(30) Foreign Application Priority Data

Jun. 30, 2017 (DE) .................... 10 2017 114 746.2

(51) Int. Cl.
*B60R 1/072* (2006.01)
*B60R 1/12* (2006.01)
(Continued)

(52) U.S. Cl.
CPC ................ *B60R 1/072* (2013.01); *B60R 1/06* (2013.01); *B60R 1/074* (2013.01); *B60R 1/081* (2013.01);
(Continued)

(58) Field of Classification Search
CPC .......... B60R 1/072; B60R 1/074; B60R 1/081
(Continued)

(56) References Cited

U.S. PATENT DOCUMENTS 4,701,037 A    10/1987  Bramer
4,877,214 A *  10/1989  Toshiaki ................. B60R 1/072
                                                             248/483
(Continued)

FOREIGN PATENT DOCUMENTS

DE    2907433 B1    9/1980
EP    1894780 A2    3/2008
(Continued)

OTHER PUBLICATIONS

International Search Report dated Oct. 9, 2018 of International application No. PCT/EP2018/067842.
Written Opinion dated Oct. 9, 2018 of International application No. PCT/EP2018/067842.

*Primary Examiner* — Ricky D Shafer
(74) *Attorney, Agent, or Firm* — Jones Day

(57) ABSTRACT

A rearview device for a vehicle includes a moveable head assembly; a base assembly to be fixed to the vehicle; an actuator assembly; and a cradle configured to attach the actuator assembly to the moveable head assembly and/or the base assembly and a vehicle with such a rearview device. The cradle has at least one tool protrusion on each side that enables attachment to a tool and facilities rotation of the cradle during assembly of the rearview device.

9 Claims, 7 Drawing Sheets

Related U.S. Application Data 2, 2018, now Pat. No. 11,370,359, which is a continuation of application No. PCT/EP2018/063665, filed on May 24, 2018, and a continuation of application No. 15/922,366, filed on Mar. 15, 2018, now Pat. No. 10,661,714.

(51) Int. Cl.
 *B60R 1/08* (2006.01)
 *B60R 1/074* (2006.01)
 *B60R 1/06* (2006.01)

(52) U.S. Cl.
 CPC .... *B60R 1/1207* (2013.01); *B60R 2001/1223* (2013.01); *B60R 2001/1253* (2013.01); *B60R 2300/8026* (2013.01)

(58) Field of Classification Search
 USPC ........................................................ 359/877
 See application file for complete search history.

(56) References Cited

U.S. PATENT DOCUMENTS

| | | | | |
|---|---|---|---|---|
| 5,604,645 | A | * | 2/1997 | Weaver ................... B60R 1/072 |
| | | | | 248/27.3 |
| 6,239,928 | B1 | * | 5/2001 | Whitehead ............. B60R 1/078 |
| | | | | 359/872 |
| 6,325,519 | B1 | * | 12/2001 | Lang ..................... B60R 1/0605 |
| | | | | 359/881 |
| 10,661,714 | B2 | * | 5/2020 | Lettis ..................... B60R 1/074 |
| 10,759,345 | B2 | * | 9/2020 | Lettis ..................... H04N 23/51 |
| 10,988,082 | B2 | * | 4/2021 | Lettis ....................... B60R 1/06 |
| 11,370,359 | B2 | * | 6/2022 | Lettis ..................... B60R 1/081 |
| 2013/0070358 | A1 | | 3/2013 | Suzuki |
| 2013/0170013 | A1 | | 7/2013 | Tonar et al. |
| 2015/0224930 | A1 | | 8/2015 | Foote et al. |

FOREIGN PATENT DOCUMENTS

| | | |
|---|---|---|
| WO | WO 2004/009408 A1 | 1/2004 |
| WO | WO 2009/064186 A1 | 5/2009 |

\* cited by examiner

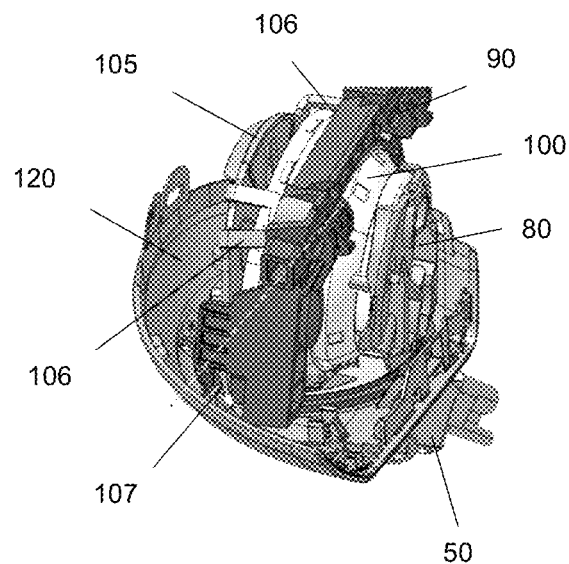
Fig. 15a
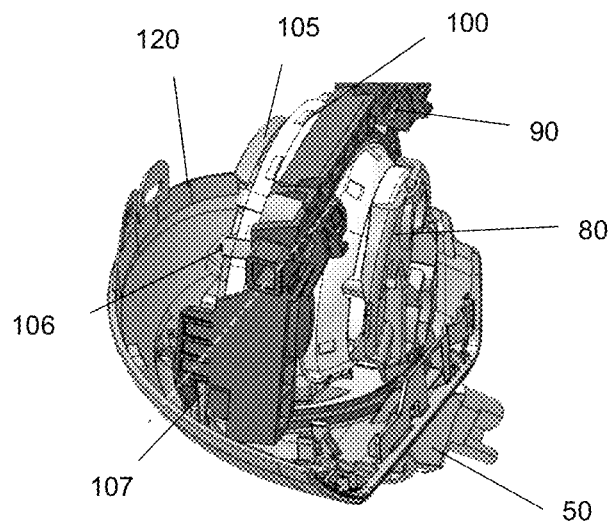
Fig. 15b
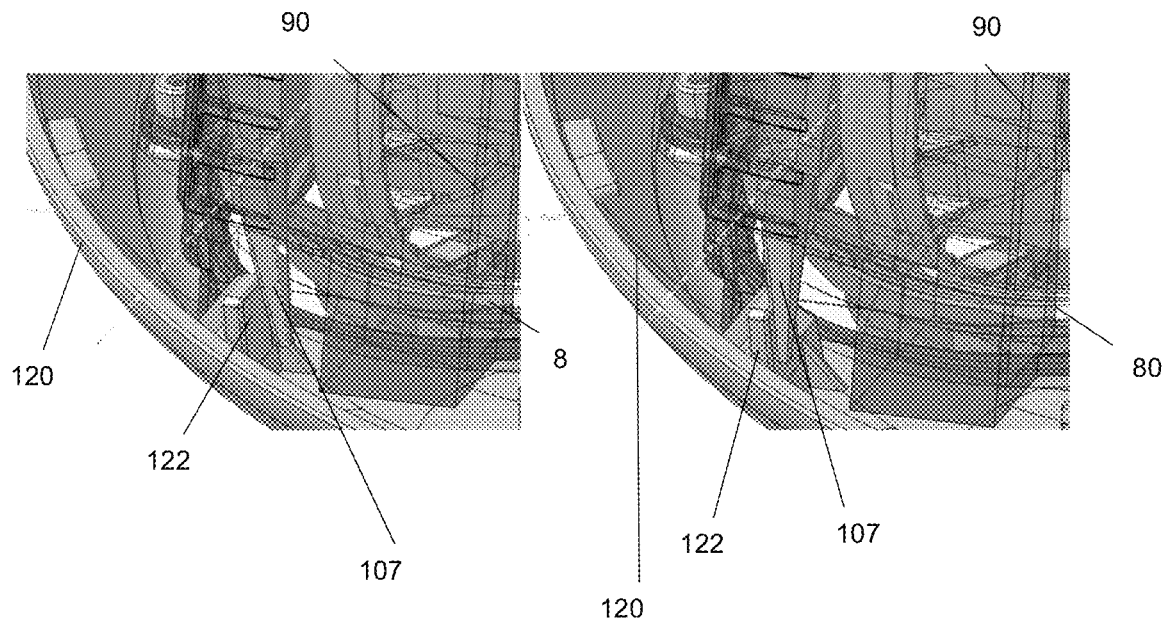
Fig. 16a
Fig. 16b

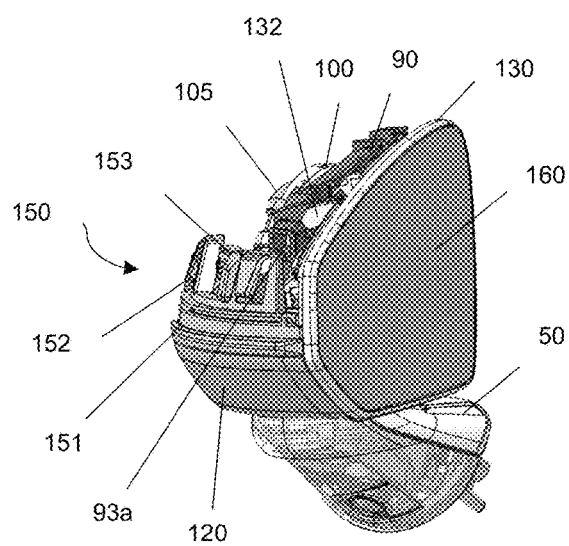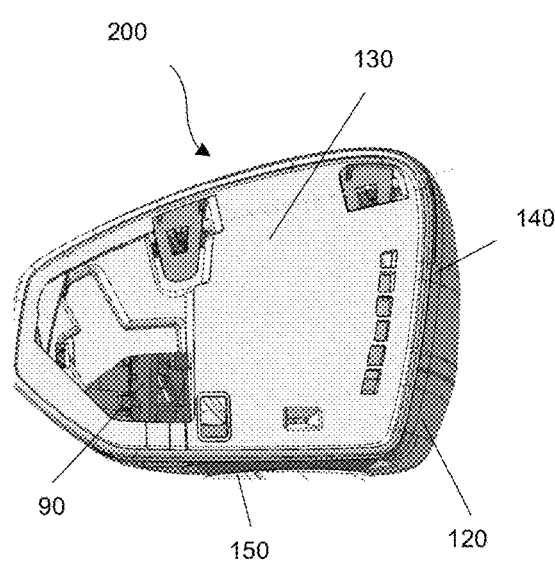
Fig. 17
Fig. 18

REARVIEW DEVICE WITH MOVEABLE HEAD ASSEMBLY AND VEHICLE THEREWITH

CROSS-REFERENCE TO RELATED APPLICATION

This application is a continuation in part of the U.S. patent application Ser. No. 16/624,507, filed on Dec. 19, 2019, which is incorporated herein by reference in its entirety for all purposes. U.S. patent application Ser. No. 16/624,507 is a national stage entry of PCT/EP2018/067842, filed on Jul. 2, 2018, which claims priority to German Application No. 10 2017 114 746.2, filed on Jun. 30, 2017, U.S. application Ser. No. 15/922,366, filed on Mar. 15, 2018, and PCT/EP2018/063665, filed on May 24, 2018, the entirety of each of which is incorporated herein by reference for all purposes.

FIELD

The technology described in this patent document relates to a rearview device for a motor vehicle with a moveable head assembly and a vehicle therewith.

BACKGROUND

Mirrors or rearview means, such as those including a camera pod, are typically exposed to the outside environment when used as a side rearview mirror device secured to the outside of a vehicle and not exposed to the outside when used inside a vehicle as an internal rearview device. Rearview devices are typically made up of many components which require a number of different assembly parts and are complicated and expensive to manufacture. In addition, when exposed to the outside environment, rearview means are subject to dirt or debris entering within the assembly. Still further, while a rearview means may include improved protection from the outside environment such rearview means fail to provide a full and expansive field of view including a wide angle view as may be desired by a driver for viewing the driver's blind spot.

EP 2 492 145 B1 describes an external rearview mirror with a mirror head and a mirror base, which are covered with at least one body element in the form of a body frame, a body cap and a mirror base cover, and a mirror glass that is installed rigidly relative to the mirror head. The mirror head rests on the mirror base, the body cover of the mirror head is composed of multiple pieces of the body frame and the body cap, and the mirror base is equipped with a mirror base cover, where the body cap has an opening designed for the passage of the mirror base and the mirror base cover. The mirror base is rigidly connected to a mirror carrier that carries an electrical glass adjustment drive, where the glass adjustment drive is connected to at least one body element.

Another external rearview mirror assembly for a motor vehicle includes a mirror base or foot provided for arrangement on the motor vehicle and a mirror head arranged on the mirror foot as well as a mirror glass accommodated in the mirror head and arranged rigidly and fixed non adjustably with respect thereto. Such an external rearview mirror is described in European Patent No. 2 492 144 B1. At least one articulation is provided between the mirror head and the arrangement of the mirror foot on the motor vehicle. The articulation includes a total of two articulation axes, and the direction vectors of the articulation axes are independent of each other. The two articulation axes are associated, jointly and/or independently of each other for swiveling the mirror head from an operating position to a swung-in position and vice versa. The articulation axes are also for swinging-in the mirror head in and against the direction of motion, adjusting an individual adjusting position of the mirror glass by adjusting the mirror head depending on, e.g., the seating position and the height of a driver of the motor vehicle. The mirror has a first adjusting drive driven by an electric motor and associated to a first articulation axis of the two articulation axes and a second adjusting drive driven by an electric motor and associated to a second articulation axis of the two articulation axes.

EP 2 253 510 B1 describes a rearview assembly with a mirror frame, mirror base, mirror housing, mirror glass, and glass actuator assembly. Specifically, it describes a method of improving the connection between components of the rearview assembly by using additional connection means to support a rigid fixture of the bezel at the mirror frame.

EP 1 894 780 A2 describes an open vehicle rear view system comprising: a pair of mirrors for obtaining a rear view, the mirrors being disposed on left and right portions of a vehicle body or a handlebar in front of a driver; wherein mirror housings mounted on the left and right portions of the vehicle body or the handlebar; mirror holders each holding the mirror, and being supported on the mirror housing so that the mirror holder can pivot between a normal view position for obtaining a normal rear view and a changed view position which is changed from the normal view position; actuators each including an electric motor rotatable in forward and reverse directions and a reduction mechanism for reducing output of the electric motor, each actuator being provided between the mirror housing and the mirror holder so as to exert power for pivoting the mirror holder; an operating member operated by the driver in order to select the normal view position or the changed view position of the mirror holders; and a drive control circuit including two pairs of position detection switches which are disposed at fixed positions within the two mirror housings in order to detect the normal view position and the changed view position of the mirror holders and determine a timing for terminating operation of the electric motors, and controlling operation of the electric motors so as to pivot the two mirror holders simultaneously according to operation of the operating member.

U.S. Pat. No. 4,701,037 describes a remote control rear view mirror, comprising: a housing having a mirror receptive opening provided therein and a mounting plate that is received therein and is adapted to be fastened to the inner back wall thereof, a drive motor unit including two separate electrical motors provided on said mounting plate and having means providing a connection to a source of electrical power, a mirror glass supporting frame member having a ball-and-socket connection with said drive motor unit and a drive connection with each of said electrical motors, a retainer ring adapted to be mounted and supported on said mounting plate and to have pivotal support and restrictive engagement with said frame member, said frame member having a rearwardly projected back wall part and said retainer ring including two complementary parts adapted for fitted engagement with said frame member back wall part, said back wall part and said retainer ring parts being formed for spherical surfaced pivotal engagement therebetween and with the same axial center as said ball-and-socket connection, means provided within said ball-and-socket connection and between said back wall and retainer ring parts for restricting and limiting the pivotal movement otherwise afforded thereto and therebetween, said means including a couple of locating pins on said back wall part for complementary engagement with slots in said retainer ring parts, a disc-like member provided on the back wall of said frame member centrally within said rearwardly projecting back wall part and being formed to provide the ball head part of said ball-and-socket connection and with a pair of relatively transversely spaced and flexible screw threaded members extending outwardly therefrom, said disc-like member being provided with tabs extending from the circumference thereof for alignment of said member with recesses in said back wall part, said drive motor unit having the socket joint of said ball-and-socket connecting provided thereon and having the electric motors thereof inclusive of worm gear drive operatively engaged with said screw threaded members on the back wall of said mirror supporting frame member part for providing the drive connection therebetween.

US 2013/170013 describes a vehicular rearview assembly that has a rounded outer perimeter edge to satisfy safety standards and contains an EC element having a complex peripheral ring, a front surface that is fully observable from the front of the assembly, and a user interface with switches and sensors that activate and configure, in cooperation with electronic circuitry of the assembly, pre-defined function(s) or device(s) of the assembly in response to the user input applied to the user interface. A complex peripheral ring may include multiple bands the structures of which is adapted to provide for specified optical characteristics of light, reflected off of the ring. Electrical communications between the electronic circuitry, the mirror element, and the user interface utilize connectors configured to exert a low contact force, onto the mirror element, limited in part by the strength of adhesive affixing the EC element to an element of the housing of the assembly.

WO 2004/009408 A1 describes a vehicular mirror assembly comprising a mirror base adapted to be mounted to a vehicle; a mirror shell mounted to the base and comprising a rearwardly-facing opening; a reflective element mounted within the mirror shell in register with the rearwardly-facing opening; a tilt actuator mounted to at least one of the mirror shell and the base, and to the reflective element for tiltably actuating the reflective element; the improvement comprising: at least one of the mountings between a first component and a second component, the first and second component mountings being between at least one of the base and the minor shell; and the tilt actuator and the at least one of the mirror shell and the base, comprises a snap-fit connection which securely retains the first component to the second component.

U.S. Pat. No. 6,239,928 B1 refers to an extendable exterior rearview mirror assembly comprising: a mounting bracket for mounting to a vehicle; a mirror subassembly having a housing and a reflective element; a clamp; and a support mounted on said mounting bracket for pivotal movement between a normal operating position and a folded position, said support extending laterally outward from said bracket when said mirror assembly is mounted to the vehicle and said support is in said normal operating position and, further, extending into said housing, said clamp being positioned in said housing and mounting said mirror subassembly to said support and permitting selective movement of said mirror subassembly along said support to one of at least two viewing positions, said clamp applying a force to urge frictional engagement between said support and said housing to limit movement of said mirror subassembly along said support until such a force is applied to said mirror subassembly sufficient to overcome said frictional engagement between said support and said housing.

SUMMARY

In an aspect, the present disclosure aims to further develop the known rearview device for a motor vehicle with a moveable head assembly such that it is easy to assemble as well as disassemble and, therefore, enhances serviceability.

In accordance with the teachings described herein, a rearview device for a vehicle is provided that includes a moveable head assembly; a base assembly to be fixed to the vehicle; an actuator assembly; and a cradle configured to attach the actuator assembly to the base assembly via a pivot joint system, where the cradle includes a base seat adapted to be put on the base assembly and to be attached by attaching a case frame to the base assembly, such that the pivot joint system acts between the base assembly and the case frame.

It is proposed that the cradle includes at least one tool protrusion, with preferably at least one tool protrusion on each side of the motor, The at least one tool protrusion is arranged to the side of the cradle and preferably at least one tool protrusion being adapted to be attached to a tool, in particular in form of a jig. The at least one tool protrusion is in particular two opposite tool protrusions, which define a rotation axis such that the cradle together with the parts attached thereto can be rotated around the rotation axis when attached to the tool.

It is proposed that the base seat of the cradle is a spherical seat, being concentrically to the axis of the pivot joint system, and/or the axis of the pivot joint system is inclined relative to the rotation axis through the at least one tool protrusion.

It is proposed that the motor cradle includes at least one first tool protrusion on a first side structurally varied from at least one second tool protrusion on a second side.

It is proposed that the least one first tool protrusion includes an inclined member extending from the first side of the motor cradle. The inclined member has an inner face with one or more sub-members extending from the inner face and a lower member which extends from the inclined member.

It is proposed that the at least one second tool protrusion includes a vertical member extending from the second side of the cradle.

The at least one second tool protrusion further includes an upper member and a lower member extending from the vertical member.

In is proposed a rearview device for a vehicle is provided that includes a moveable head assembly; a base assembly to be fixed to the vehicle; an actuator assembly; and a cradle configured to attach the actuator assembly to the base assembly via a pivot joint system, where the cradle includes a base seat adapted to be put on the base assembly and to be attached by attaching a case frame to the base assembly, such that the pivot joint system acts between the base assembly and the case frame. The cradle includes at least one tool protrusion, with preferably at least one tool protrusion on each side of the motor. The at least one tool protrusion is arranged to the side of the cradle and preferably the at least one tool protrusion being adapted to be attached to a tool, in particular in form of a jig. The at least one tool protrusion is in particular two opposite tool protrusions, which define a rotation axis such that the cradle together with the parts attached thereto can be rotated around the rotation axis when attached to the tool. The motor cradle includes at least one first tool protrusion on a first side structurally varied from at least one second tool protrusion on a second side.

BRIEF DESCRIPTION OF THE DRAWINGS

For the purpose of illustration, certain examples of the invention are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Further features, details and advantages of the invention are explained in the appended claims, in the drawings and in the description of a preferred embodiment of the rearview device according to the invention given below.

FIGS. 15a and 15b are perspective views of the motor cradle of FIG. 6 together with the case frame, the motor, a lower case and a cradle clamp, prior and after closure, respectively.

FIGS. 16a and 16b are perspective part views corresponding to enlargements of FIGS. 15a and 15b.

FIG. 17 is a perspective view of the motor cradle of FIG. 6 together with the base assembly, the lower case, the motor, the cradle clamp, a turn signal indicator module and a bezel assembly carrying reflective element.

FIG. 18 is a perspective view of the motor cradle of FIG. 6 within a head assembly.

Figure 1:
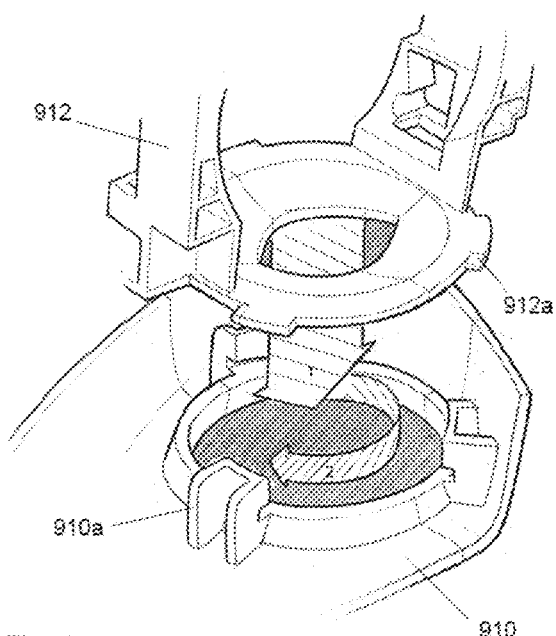
FIG. 1 is a diagram illustrating attachment of a motor cradle and a lower case of a rearview device with turn and snap connectivity.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

A rearview device of the invention comprises a base assembly and a head assembly, with the head assembly being moveable relative to the base assembly to be attached to a vehicle. The base assembly comprises a base frame, and the head assembly comprises a motor cradle, a case frame, an actuator assembly, a cradle clamp, several covers, seal elements, wires, light and/or sensor modules and at least one rearview means in form of a reflective element and/or camera. The motor cradle acts as main backbone of rearview device as it locates and provides structure and allows attachment of a plurality of parts, in particular when mounted to tool/jig to facilitate assembly. In the following embodiments of said motor cradle will be described.

Referring to FIG. 1, a quick assembly rearview device is illustrated which includes a motor cradle 912 and a lower case 910. The motor cradle 912 is attached to the lower case 910 and configured to receive an actuator assembly which is described in more detail below. The attachment mechanism is a quick and easy attachment mechanism requiring a first step of placing the motor cradle 912 above and on top of the lower case 910 as shown by the large down arrow. A second step involves turning the motor cradle 912 so that cradle projections 912a of the motor cradle 912 engage tab vertical fixation lugs 910a of the lower case 910. This is referred to as turn and snap connectivity.

The assembly as described herein allows both the motor cradle 912 and the lower case 910 to be fixed and located around a central axis (pivot axis) and onto a common plane. This will reduce the tolerance stack back to the motor rotation center and components.

Figure 2:
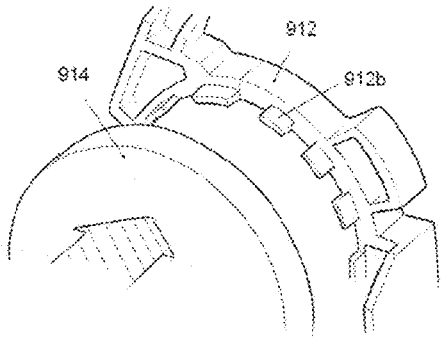
FIG. 2 is a diagram illustrating attachment of an actuator assembly and the motor cradle of the rearview device of FIG. 1.

FIG. 2 is a diagram illustrating attachment of an actuator assembly 914 to the motor cradle 912 of the rearview device of FIG. 1. The actuator assembly 914 is configured to actuate the movement of the rearview device in accordance with the examples described throughout this application. The actuator assembly 914 is configured to easily and quickly attach to the motor cradle 912 by pushing the actuator assembly 914 in a receiving portion of the motor cradle 912 and engaging cradle teeth 912b into corresponding gaps between teeth (not shown) of the actuator assembly 914. Thus, the cradle teeth 912b fit in gaps between teeth (not shown) of the actuator assembly 914, and the teeth (not shown) of the actuator assembly 914 fit in between the gaps between the cradle teeth 912b.

Such an attachment prevents rotation of the actuator assembly 914 in the motor cradle 912. Small clips may also be used to keep the actuator assembly 914 fixed with respect to the motor cradle 912 before a cradle clamp 916, described below, is fitted.

Figure 3:
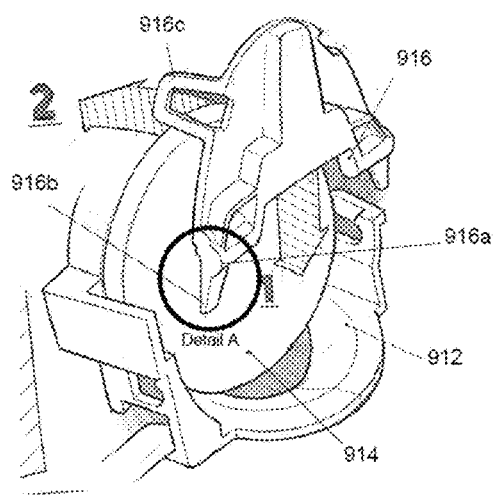
FIG. 3 is a diagram illustrating attachment of a cradle clamp, the motor cradle, and the actuator assembly of the rearview device of FIG. 1.

FIG. 3 is a diagram illustrating attachment of a cradle clamp 916 to the motor cradle 912 and the actuator assembly 914 of the rearview device of FIG. 1. The cradle clamp 916 may be attached to the motor cradle 912 and the actuator assembly 914 to clamp the actuator assembly 914 to the motor cradle 912. The cradle clamp 916 should first slide between the actuator assembly 914 and a front portion of the motor cradle 912, as illustrated by the down arrow in FIG. 3. This results in clamp prong 916b and clamp cam 916a engaging the front portion of motor cradle 912. This engagement is described in more detail with reference to FIG. 4. Subsequently, the cradle clamp 916 should be rotated towards the actuator assembly 914 until clamp clips 916c are engaged with corresponding retaining projections (not shown) on the motor cradle 912. This also causes rotation of the clamp prong 916b and clamp cam 916a until the clamp clips 916c are engaged and the actuator assembly 914 is clamped to the motor cradle 912.

Figures 4, 5:
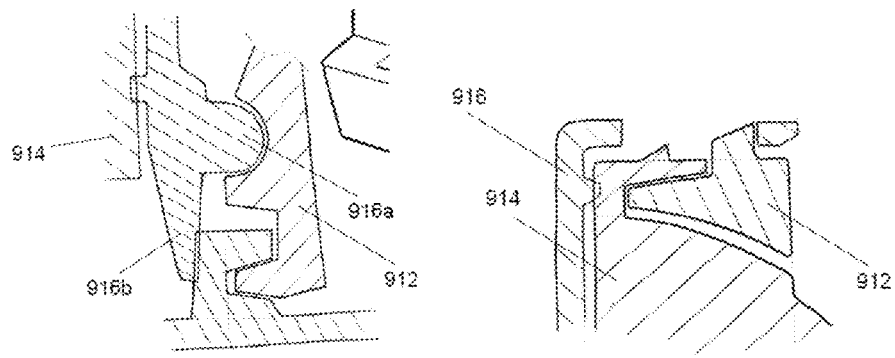
FIG. 4 is a diagram illustrating a cross-section of the cradle clamp at detail A of FIG. 3 after engagement with the motor cradle and the actuator assembly of the rearview device of FIG. 1.
FIG. 5 is a diagram illustrating a cross-section of the cradle clamp, the motor cradle, and the actuator assembly of the rearview device of FIG. 1, after attachment.

FIG. 4 is a diagram illustrating a cross-section of the cradle clamp 916 at detail A of FIG. 3 after engagement with the motor cradle 912 and the actuator assembly 914 of the rearview device of FIG. 1. The clamp cam 916a may be a curved projection with a corresponding receiving portion on the motor cradle 912 to allow rotation of the cradle clamp 916. This allows rotating the cradle clamp 916 shut until the clamp clips 916c are clipped onto the motor cradle 912 from the top. Clamping pressure may be tuned to provide increased loading.

FIG. 5 is a diagram illustrating a cross-section of the cradle clamp 916, the motor cradle 912, and the actuator assembly 914 of the rearview device of FIG. 1 after attachment. In fact, after assembly of the cradle clamp 916, the motor cradle 912, and the actuator assembly 914, all three components of the rearview device are securely attached. Once the actuator assembly 914 is located and the cradle clamp 916 is engaged, the motor cradle 912 and an adapter ring of the actuator assembly 914 combine to improve stiffness.

Figure 6:
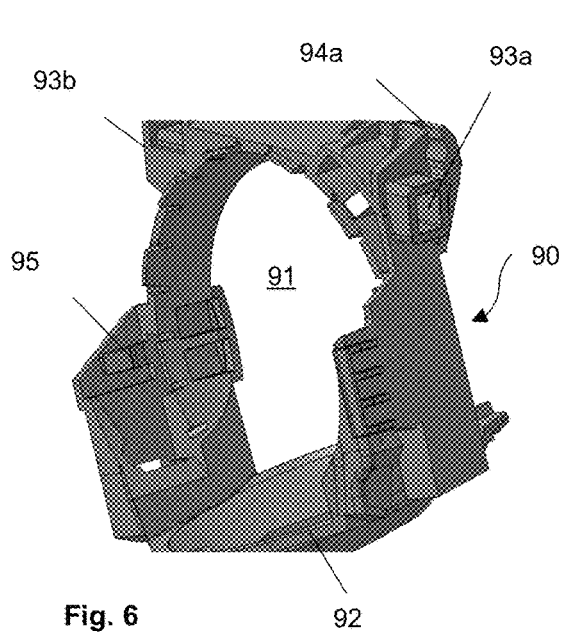
FIG. 6 is a perspective view of a motor cradle for a rearview device according to an embodiment of the invention.

FIG. 6 depicts the backbone of a rearview device of an embodiment of the invention in form of a cradle 90. The cradle 90 provides a motor opening 91 for the attachment of a motor, a base seat 92 in order to be attached to a base assembly, tool openings 93a, 93b in order to attach the cradle 90 to a jig like light tool to facilitate assembly of the rearview device, openings 94a, 94b for attaching a bezel assembly and harness and a clamp element 95 for embracing a clamp cradle. The following FIGS. 7 to 18 will further illuminate the different functions of the cradle 90.

Figure 7:
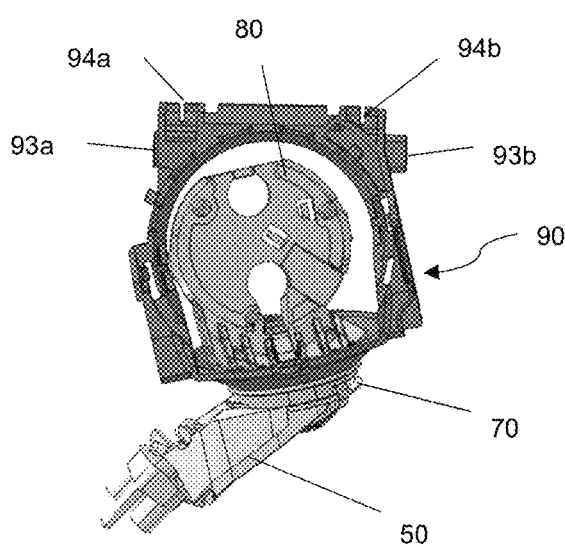
FIG. 7 is a perspective view of the motor cradle of FIG. 6 together with a case frame attached to a base assembly.

As can be seen from FIG. 7, the cradle 90 can be placed with its seat 92 on a base assembly 50 with sealing means 70 being arranged there between and a case frame 80 being attached to the base frame 50 and thereby attaching the cradle 90 to the base assembly 50.

Figure 8:
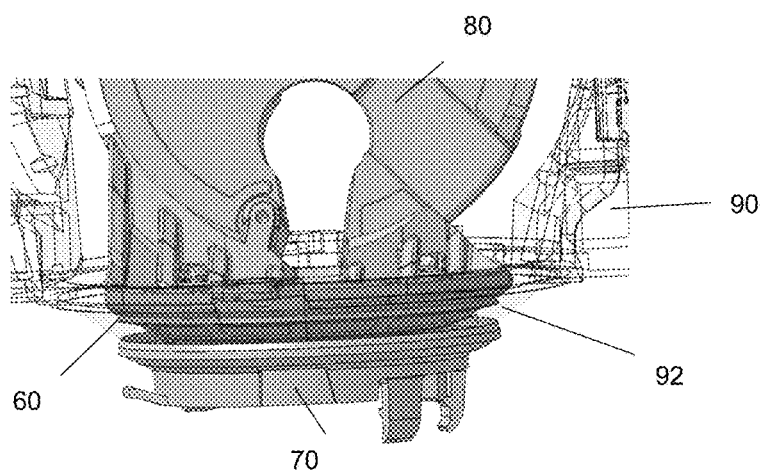
FIG. 8 is a part side view of the motor cradle of FIG. 6 together with a case frame and sealing means, with the motor cradle shown in phantom.

FIG. 8 demonstrates a pivot joint system acting between the base assembly 50 and the case frame 80, with the cradle 90 being arranged between the base assembly 50 and the case frame 80, surrounded on each side of its seat 92 by sealing means 60, 70. Said pivot joint system corresponds substantially to the one described in detail in the international patent application PCT/EP 2018/063665, to which reference is made in this respect.

Figure 9:
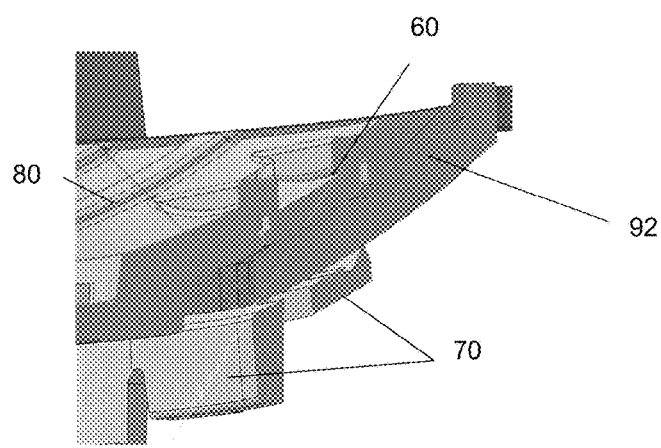
FIG. 9 is a part cross sectional view of the motor cradle of FIG. 6 together with the case frame and sealing means.

Each sealing element 60, 70 is provided as a two component gasket with a hart part and a soft part. The hard part serves for attachment and the soft part for compensating tolerances. FIG. 9 shows the pivot joint system in more detail with respect to the relative arrangement of the two sealing means 60, 70 on both sides of the base seat 92 of the cradle 90.

Figure 10:
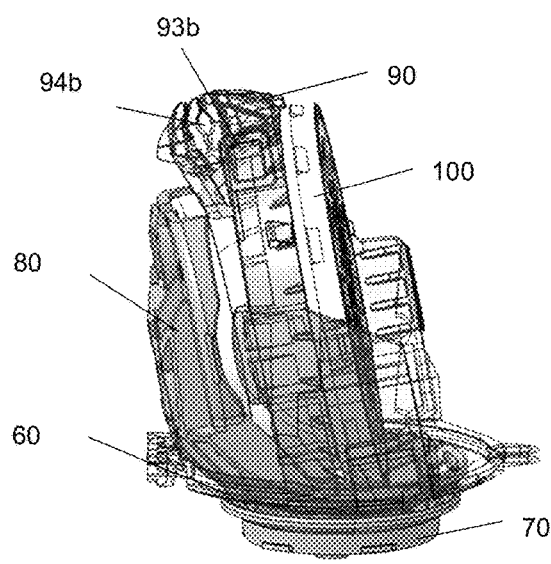
FIG. 10 is a perspective view of the motor cradle of FIG. 6 together with the case frame, the sealing means and a motor.

Turning now to FIG. 10, the same illustrates the main components of the head assembly, namely in form of the sub-assembly of the case frame 80, the motor cradle 90 and the sealing means 60, 70 described with reference to FIGS. 8 and 9, together with a motor 100 of an actuator assembly being attached to the motor cradle 90 and extending through the motor opening 91. The respective attachment is well known in the prior art.

Figure 11:
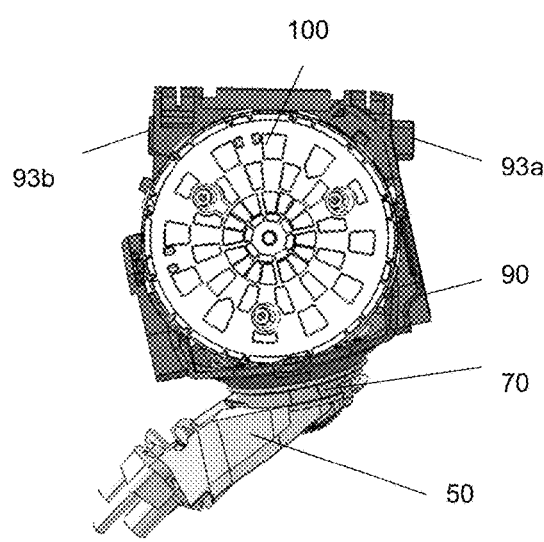
FIG. 11 is a perspective view of the motor cradle of FIG. 6 together with the base assembly, the motor and the sealing means.
Figure 12:
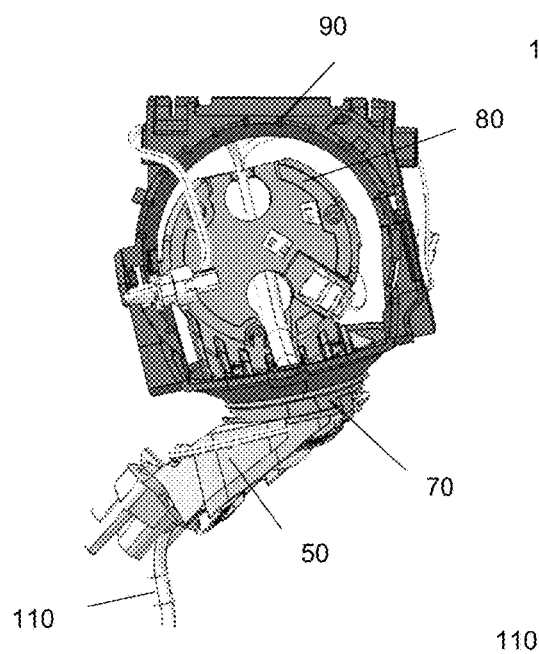
FIG. 12 is a perspective view of the motor cradle of FIG. 6 together with the base assembly, the case frame, the sealing means and harness.

The sub assembly of FIG. 10 is shown in a different perspective view in FIG. 11 as well. FIG. 12 shows the sub assembly of FIG. 11 without the motor 100, but with harness 110, whereas FIG. 13 also shows the motor 100.

Figure 13:
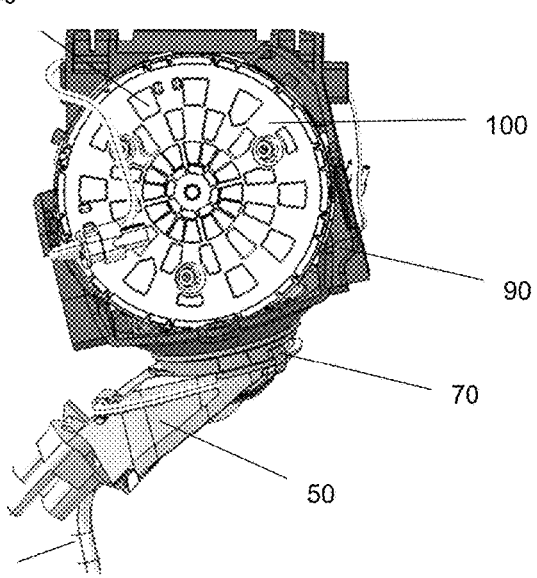
FIG. 13 is a perspective view of the motor cradle of FIG. 6 together with the base assembly, the motor, the sealing means and the harness.
Figure 14:
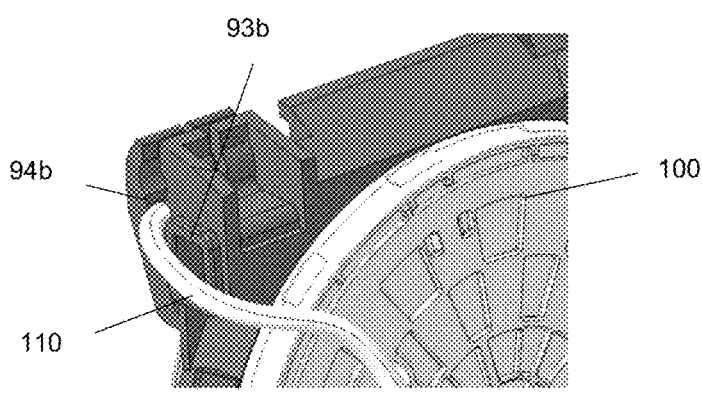
FIG. 14 is a perspective part view of the motor cradle of FIG. 6 together with the motor and the harness.

From the enlargement of FIG. 14 it can be seen that the harness 110 is hold within the opening 94b of the cradle 90. In fact, as shown in FIGS. 12 and 13, the harness 110 passes through both openings 94a, 94b of the cradle 90.

With respect to FIGS. 15a and 15b, the attachment of a motor clamp 105 is demonstrated, with FIG. 15a showing the motor clamp 105 after being pushed into the space between the motor cradle 90 and a case lower 120, whereas FIG. 15b shows the motor clamp 105 after being rotated to attach clips 106 to the motor 100. The clips 106 are provided at the upper end of the motor clamp 105, whereas at the lower end clamps prongs 107 are provided.

FIGS. 16a and 16b demonstrate the position of the clamp prongs 107 after the motor clamp 105 has been pushed between the motor cradle 90 and the case lower 120, see FIG. 16a and after the motor clamp 105 has been rotated for the clip connection with the motor 110, forcing the clamp prong 107 to push against a case projection 122 of the lower case 120, and, thereby, securing the attachment, see FIG. 16b.

FIG. 17 shows the rearview device sub-assembly of FIGS. 15a and 15b with a bezel assembly 130 carrying a reflective element 160 and a turn signal indicator module 150 being attached.

The bezel assembly 130 is provided with an axle 132 to be inserted into the openings 94a and 94b of the cradle 90, thereby fixing the arrangement of the harness 110 in the openings 94a, 94b by closing the respective openings. Still further, the attachment of the axle 132 within the openings 94a, 94b provides a hinge connection enabling the bezel assembly 130 to be entered from above into the openings 94a, 94b with its axle 132 and to be downwardly rotated to attach the bezel assembly 130 to the lower case 120 via a snap connection. The respective attachment of the bezel assembly 130 is described in further detail in the German patent application DE 10 2017 114 746, to which reference is made in this respect.

To finalize the head assembly 200, an upper case 140 is to be attached to the lower case 120 via the turn signal indicator module 150 as well as to the bezel assembly 130, see FIG. 18. The turn signal indicator module 150, as can be best seen in FIG. 17, comprises a light window 151 and a housing 152 providing clips elements 153 for the attachment to the lower case 120 as well as the upper case 140.

The assembly described above is facilitated by attaching the motor cradle 90 to a not shown jig, namely by inserting projections of the jig into the tool openings 93a, 93b being arranged at the upper end of the motor cradle 90 next to the openings 94a, 94b. As the tool openings 93a, 93b are aligned to each other a rotational axis is defined therewith and allows to rotate the motor cradle 90 with the help of the jig in order to easily attach the different parts of the head assembly to the motor cradle 90. For facilitating the respective rotation, the rotation axis defined by the tool openings 93a, 93b is inclined with respect to the pivot axis of a joint system. As the base seat 92 of the motor cradle 90 has a partly spherical shape being concentrically arranged relative to the pivot axis of the pivot joint system, the base seat 92 seems to be inclined with respect to the upper edge of the cradle 90 running in parallel to the rotational axis through the tool openings 93a, 93b, as can be best seen in FIG. 6.

Figure 19:
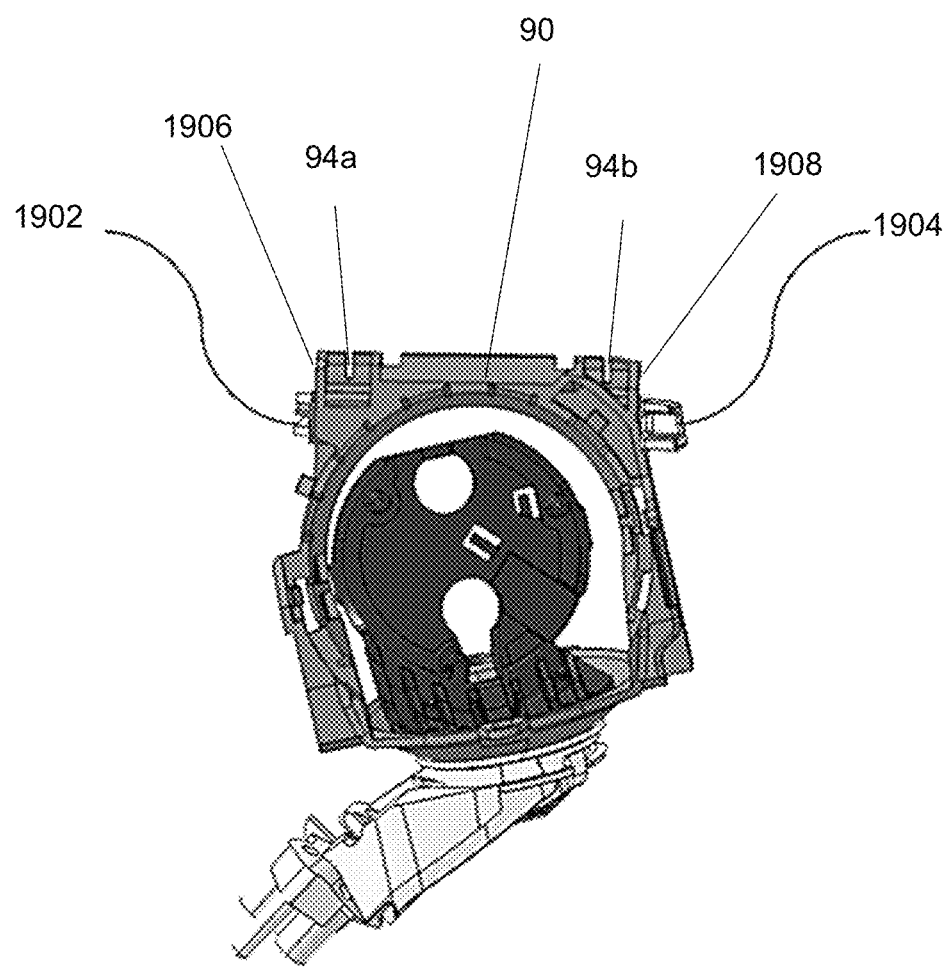
FIG. 19 is a front perspective view of a motor cradle with tool protrusions according to an embodiment of the present disclosure.

FIG. 19 depicts the front perspective view of a motor cradle 90 of a rearview device according to another embodiment of the present disclosure. The motor cradle 90 provides a motor opening 91 (best seen in FIG. 6) for the attachment of a motor (not shown), a base seat 92 in order to be attached to a base assembly 50, a first tool protrusions 1902 and a second tool protrusion 1904 in order to attach the motor cradle 90 to a jig like tool to facilitate assembly of the rearview device, and openings 94a, 94b for attaching a bezel assembly and harness and a clamp element (not shown). The first tool protrusions 1902 and the second tool protrusion 1904 replaces the tool openings 93a, 93b, as seen in FIG. 6. The first tool protrusion 1902 and the second tool protrusion 1904 are opposite each other and are arranged at the upper end of the motor cradle 90 next to the openings 94a, 94b. The first tool protrusion 1902 is arranged next to the opening 94a on a first side 1906 and the second tool protrusion 1904 located adjacent to the opening 94b on a second side 1908 of the motor cradle 90. The first tool protrusions 1902 and the second tool protrusion 1904 are aligned to each other defining a rotational axis therewith and allow the motor cradle 90 to rotate with the help of the jig in order to easily attach the different parts of the head assembly to the motor cradle 90. For facilitating the respective rotation, the rotation axis defined by the at least one first tool protrusion 1902 and at least one second tool protrusion 1904 is inclined with respect to the pivot axis of a joint system. As the base seat 92 (seen in FIG. 6) of the motor cradle 90 has a partly spherical shape being concentrically arranged relative to the pivot axis of the pivot joint system, the base seat 92 is inclined with respect to the upper edge of the motor cradle 90 running in parallel to the rotational axis through the at least one first tool protrusion 1902 and the at least one second tool protrusion 1904.

Figure 20:
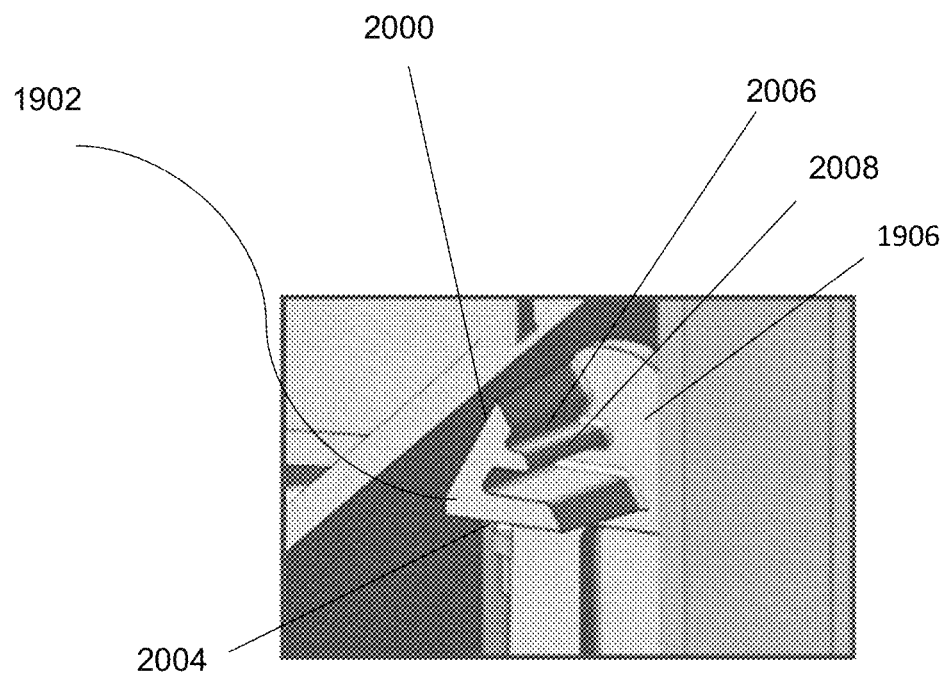
FIG. 20 is a left perspective view of a motor cradle illustrating a first tool protrusion according to the present disclosure.

As illustrated in FIG. 20, the first tool protrusion 1902 comprises an inclined member 2000 and a lower member 2004 extending outward therefrom, from the first side 1906 of the motor cradle 90. One or more sub-members 2008 are arranged on an inner face 2006 of the inclined member 2000. The one or more sub-members 2008 in this form are substantially parallel to the lower member 2004 and have a relatively smaller surface area than the lower member 2004. In other forms, the one or more sub-members maybe the same or larger area than the lower member with a different angular orientation.

Figure 21:
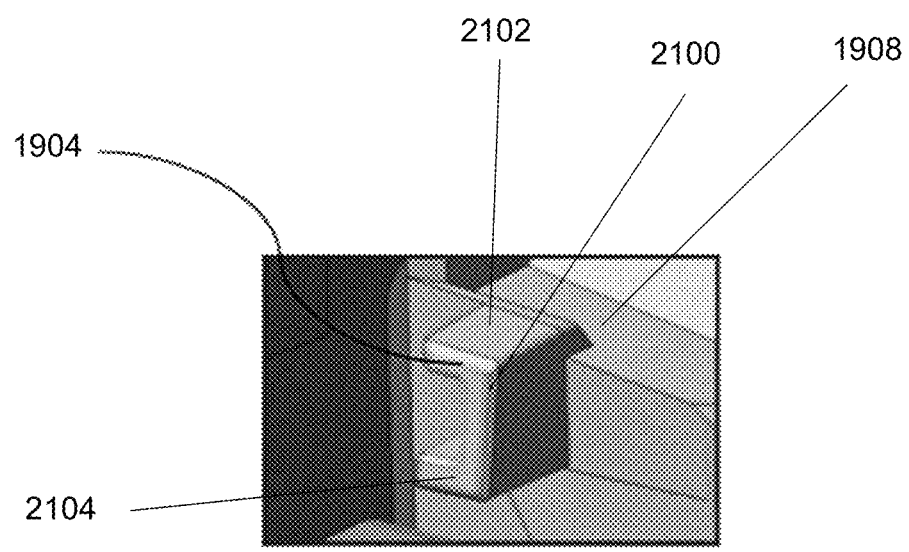
FIG. 21 is a right perspective view of a motor cradle illustrating a second tool protrusion according to the present disclosure.

As seen from FIG. 21, the second tool protrusion 1904 is structurally varied from the first tool protrusion 1902. The second tool protrusion 1904 comprises a vertical member 2100 extending from the second side 1908 of the motor cradle 90. Further, an upper member 2102 and a lower member 2104 lie adjacent to the vertical member 2100. In one form, the upper member 2102 may be arranged substantially parallel to the lower member 2104. In other forms, the upper member 2102 and the lower member 2104 may have a different angular orientation to each other. The structural variations between the first tool protrusion 1902 located on the first side 1906 and second tool protrusion 1904 positioned the second side 1908 of the motor cradle 90 prevent improper positioning of the motor cradle 90 while mounting to the tool/jig. The first tool protrusion 1902 and second tool protrusions 1904 lock into respective receiving portions (not shown) of the tool like jig, enabling attachment of the motor cradle 90 thereby facilitating the jigs to rotate the motor cradle 90 during assembling. The first and second tool protrusions 1902, 1904 may take other shapes or forms without deviating from the scope of the present disclosure. The first and second tool protrusions 1902, 1904 are integrally molded with the motor cradle 90 improving the ease manufacturing over the tool openings 93a, 93b (FIG. 6). The first and second tool protrusions 1902, 1904 may be formed in a main tooling direction, thus avoiding additional steps to form recesses required for the tool openings 93a, 93b as seen in FIG. 6.

The sequence of attaching the different rearview device parts to the motor cradle 90 as well as the angle of rotation of the motor cradle 90 to facilitate the respective attachment lies within the knowledge of a skilled person and might be varied depending on individual preferences.

Different functions and devices can be incorporated into and/or controlled with the help of rearview devices including especially also cameras.

Especially useful are functions and devices to enhance, extend and/or sustain the functionality of the rearview device during normal or extreme conditions. This may include heating and/or cooling means, cleaning means such as wipers, liquid and/or gaseous sprays, actuator means for moving the rearview device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rearview devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device including an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REARVIEW DEVICE AND MOTOR VEHICLE and claiming priority to European patent application No. 2944866, filed on May 12, 2014 for OPTICAL UNIT, DISPLAY DEVICE, REARVIEW DEVICE AND MOTOR VEHICLE INCLUDING THE SAME which are all hereby incorporated herein by reference. Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REARVIEW DEVICE which are all hereby incorporated herein by reference. A lighting device for a rearview device or a footwell device of a vehicle, including at least one luminous means is disclosed in German patent application No. 102015115555, filed on Sep. 9, 2015 for ILLUMINATION DEVICE, REARVIEW DEVICE, FOOTWELL DEVICE AND VEHICLE which is hereby incorporated herein by reference. A light module for a light assembly of an exterior rearview device is disclosed in European patent application No. 3138734, filed on Sep. 3, 2015 for LIGHT MODULE, LIGHT ASSEMBLY AND REARVIEW DEVICE FOR A VEHICLE which is hereby incorporated herein by reference. A lighting device for a vehicle component, in particular for a rearview device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REARVIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REARVIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUB- STRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REARVIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REARVIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REARVIEW DEVICE FOR A MOTOR and published as US 20150358590, which is hereby incorporated herein by reference.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 50 base assembly
60 sealing means
70 sealing means
80 case frame
90 motor cradle
91 motor opening
92 base seat
93a tool opening
93b tool opening
94a opening
94b opening
95 clamp element
100 motor
105 cradle clamp
106 clamp clips
107 clamp prong
110 harness
120 lower case
122 case projection
130 bezel assembly
132 axle
140 upper case
150 turn signal indicator module
151 light window
152 housing
153 clips element
160 reflective element
200 head assembly
910 lower case
910a vertical fixation lugs
912 motor cradle
912a cradle projections
912b cradle teeth
914 actuator assembly
916 cradle clamp
916a clamp cam
916b clamp prong
916c clamp clip
1902 first tool protrusion
1904 second tool protrusion
1906 first side
1908 second side
2000 inclined member
2004 lower member
2006 inner face
2008 sub-member
2100 vertical member
2102 upper member
2104 lower member

What is claimed is:

1. A rearview device for a vehicle, comprising:
a moveable head assembly;
a base assembly to be fixed to the vehicle;
an actuator assembly; and
a motor cradle configured to attach the actuator assembly to the base assembly via a pivot joint system, wherein the motor cradle comprises a base seat adapted to be put on the base assembly and to be attached by attaching a case frame to the base assembly, such that the pivot joint system acts between the base assembly and the case frame, and
wherein
the motor cradle comprises at least one tool protrusion, with at least one first tool protrusion on a first side and at least one second tool protrusion on a second side of the motor cradle, and
with the at least one first and at least one second tool protrusions being adapted to be attached to a tool, in form of a jig, and
with the at least one first tool protrusion located opposite of the at least one second tool protrusion defining a rotation axis such that the motor cradle can be rotated around the rotation axis when attached to the tool.

2. The rearview device of claim 1, wherein
the base seat of the motor cradle is a spherical seat, being concentrical to an axis of the pivot joint system, and
the axis of the pivot joint system is inclined relative to the rotation axis through the at least one first and second tool protrusions.

3. The rearview device of claim 1, wherein the motor cradle comprises at least one first tool protrusion on the first side that is structurally varied from at least one second tool protrusion on the second side.

4. The rearview device of claim 1, wherein the at least one first tool protrusion comprises an inclined member extending from the first side of the motor cradle.

5. The rearview device of claim 4, wherein the inclined member has an inner face with one or more sub-members extending from the inner face.

6. The rearview device of claim 4, wherein the at least one first tool protrusion further comprises a lower member extending from the inclined member.

7. The rearview device of claim 1, wherein the at least one second tool protrusion comprises a vertical member extending from the second side of the motor cradle.

8. The rearview device of claim 7, wherein the at least one second tool protrusion further comprises an upper member and a lower member and extending from the vertical member.

9. A rearview device for a vehicle, comprising:
a moveable head assembly;
a base assembly to be fixed to the vehicle;
an actuator assembly; and
a motor cradle configured to attach the actuator assembly to the base assembly via a pivot joint system, wherein the motor cradle comprises a base seat adapted to be put on the base assembly and to be attached by attaching a case frame to the base assembly, such that the pivot joint system acts between the base assembly and the case frame, and wherein the motor cradle comprises at least one protrusion,
with at least one protrusion on each side of the motor cradle, and
with at least one protrusion being adapted to be attached to a tool, in form of a jig, and with two opposite protrusions defining a rotation axis such that the motor cradle can be rotated around the rotation axis when attached to the tool,
wherein the at least one protrusion is at least one first tool protrusion on a first side and at least one second tool protrusion on a second side with the at least one first tool protrusion structurally varied from the at least one second tool protrusion.

\* \* \* \* \*